United States Patent [19]

Runkel et al.

[11] Patent Number: 4,526,058

[45] Date of Patent: Jul. 2, 1985

[54] CENTERING AND LOCK MECHANISM FOR HYDRAULIC ACTUATOR

[75] Inventors: Manfred A. Runkel, Valencia; William W. Hsu, Burbank; Anthony E. Singer, Newhall; William J. Zlotski, Canyon County, all of Calif.

[73] Assignee: HR Textron Inc., Valencia, Calif.

[21] Appl. No.: 500,470

[22] Filed: Jun. 2, 1983

[51] Int. Cl.[3] ........................ G05G 5/06; F16H 21/44

[52] U.S. Cl. ........................................ 74/531; 74/110; 244/224

[58] Field of Search .................... 74/110, 531; 244/78, 244/224, 226; 92/114, 136, 140

[56] References Cited

U.S. PATENT DOCUMENTS

| | | | |
|---|---|---|---|
| 251,070 | 12/1881 | Shaw | 292/170 |
| 2,036,154 | 3/1936 | Littledale | 292/170 |
| 2,213,264 | 9/1940 | Wall | 70/181 |
| 2,329,743 | 9/1943 | Cameron | 74/527 |
| 2,369,513 | 2/1945 | Zahodiakin | 74/55 |
| 2,512,150 | 6/1950 | Geren | 92/23 |
| 2,598,560 | 5/1952 | Kenyon | 188/67 |
| 2,684,770 | 7/1954 | Park | 91/44 |
| 2,750,994 | 6/1956 | Howell | 74/531 |
| 2,861,549 | 11/1958 | Gardener | 91/44 |
| 3,157,194 | 11/1964 | Stolte | 74/527 |
| 3,168,759 | 2/1965 | Johannigman | 74/527 |
| 3,177,976 | 4/1965 | Wenzel | 188/67 |
| 3,283,596 | 11/1966 | Roeser | 74/527 |
| 3,358,565 | 12/1967 | Townsend | 91/411 |
| 3,416,390 | 12/1968 | Houk | 74/531 |
| 3,572,161 | 3/1971 | Lichtenberger et al. | 74/527 |
| 3,834,198 | 9/1974 | Wiczer | 70/181 |
| 3,834,282 | 9/1974 | Kongelbeck | 92/10 |
| 3,890,814 | 6/1975 | Fantoni | 292/170 |
| 4,073,345 | 2/1978 | Miller | 92/23 |
| 4,177,681 | 12/1979 | Wess | 74/110 |

*Primary Examiner*—George H. Krizmanich
*Assistant Examiner*—Dirk Wright
*Attorney, Agent, or Firm*—Nilsson, Robbins, Dalgarn, Berliner, Carson & Wurst

[57] ABSTRACT

A hydraulic actuator including a piston rod having a centering mechanism associated therewith which, upon actuation, will return the piston rod to a predetermined position even against loads and lock it in that position and hold it there even without the presence of hydraulic power. The centering and locking mechanism includes a drive mechanism and cam surfaces on the piston rod which are engaged by drive surfaces on the driving mechanism. The drive and cam surfaces are opposed ramps with one of the ramps on the drive mechanism always disposed opposite one of the ramps on the actuator, such that at any position of the stroke of the actuator piston rod the centering and locking mechanism may be actuated and is operable to return the actuator to the predetermined position and lock it in place. The cam surfaces are infinitely variable as to their position on the piston rod within the limits of the dimensions of the drive mechanism.

14 Claims, 8 Drawing Figures

CENTERING AND LOCK MECHANISM FOR HYDRAULIC ACTUATOR

BACKGROUND OF THE INVENTION

This invention relates to hydraulically driven actuators and more particularly to such an actuator which may be centered and locked at a predetermined position.

It has long been desired to lock a hydraulic actuator in a predetermined position with the position being determined by the particular application in which the hydraulic actuator is being utilized. Such actuators are specifically used in the aerospace industry for positioning of various parts of aerospace vehicles including the control surfaces thereof. It is, however, to be understood that the present invention is not limited to such an application.

Typical locking devices for hydraulic actuators of the prior art include such structures as a pin or tongue which is inserted through a slot provided in the piston rod of the hydraulic actuator, an eccentric ring positioned around the actuator piston rod which, upon rotation, grips the rod to preclude movement, a latching dog which engages threads or grooves in the piston rod, a U-shaped member which is disposed within opposed grooves on the actuator piston rod, a reduced diameter portion of the piston rod which engages stops positioned at spaced apart positions, or the like.

The best prior art known to applicants is shown in the following U.S. Pat. Nos.:

| | | |
|---|---|---|
| 2,213,264 | J. E. Wall | September 3, 1940 |
| 2,329,743 | M. B. Cameron | September 21, 1943 |
| 2,369,513 | V. F. Zahodiakin | February 13, 1945 |
| 2,512,150 | V. E. Geren | June 20, 1950 |
| 2,598,560 | B. F. Kenyon | May 27, 1952 |
| 2,684,770 | G. S. Park | July 27, 1954 |
| 2,750,994 | R. B. Howell, Jr. | June 19, 1956 |
| 2,861,549 | C. A. Gardener | November 25, 1958 |
| 3,157,194 | R. D. Stolte | November 17, 1964 |
| 3,168,759 | J. P. Johannigman | February 9, 1965 |
| 3,177,976 | P. D. Wenzel | April 13, 1965 |
| 3,283,596 | J. O. Roeser | November 8, 1966 |
| 3,416,390 | R. D. Houk | December 17, 1968 |
| 3,572,161 | H. V. Lichtenberger et al | March 23, 1971 |
| 3,834,198 | M. Wiczer | September 10, 1974 |
| 3,834,282 | S. Kongelbeck | September 10, 1974 |
| 4,073,345 | M. E. Miller | February 14, 1978 |

In all instances, the particular apparatus as disclosed works well for the application intended. However, none of the structures shown in the prior art known to applicants positions the hydraulic actuator at a predetermined variable desired position and locks it in place irrespective of the position of the actuator at the time the command signal is received to position the actuator at the predetermined position and lock it in that position.

SUMMARY OF THE INVENTION

The present invention includes an apparatus for moving an actuator rod to a predetermined position and locking the rod at that position through utilization of cam surfaces and drive surfaces formed by opposed ramps, one of which is on the actuator rod and the other of which is upon the drive means and means for moving the drive surface into engagement with the cam surface.

In accordance with more specific aspects of the present invention the construction permits an actuator of shorter length than other comparable actuators. Furthermore the piston rod center of the actuator embodying the present invention is left unobstructed thus allowing installation of position sensors.

DETAILED DESCRIPTION

Figure 1:
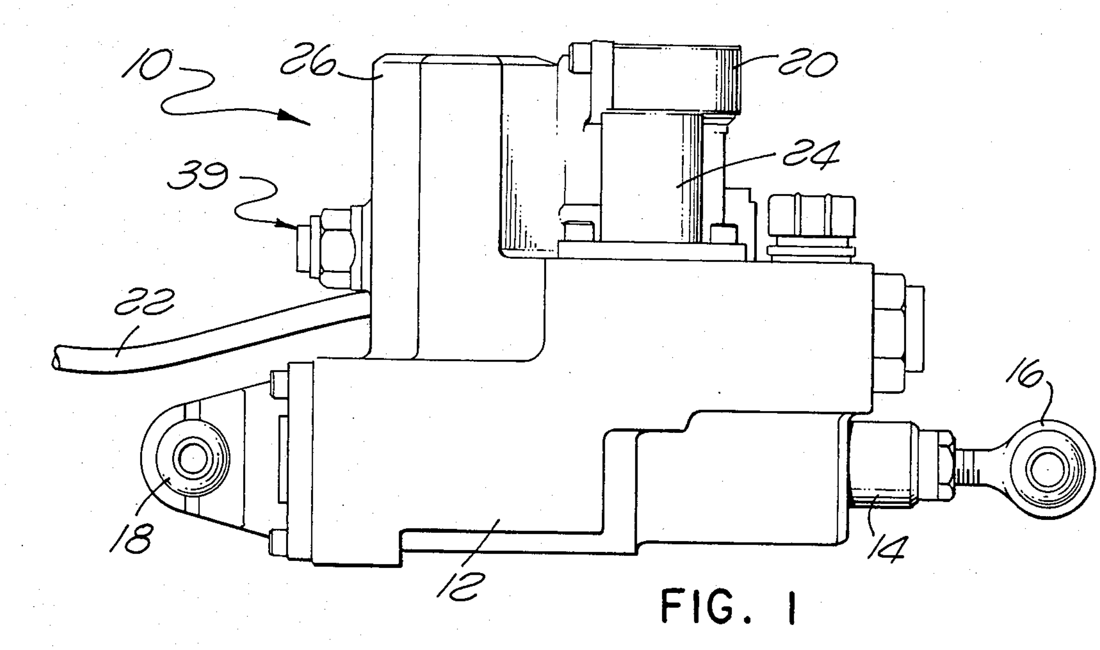
FIG. 1 is a side elevational view of an apparatus which is constructed incorporating the apparatus of the present invention.

As is shown in FIG. 1 an assembly 10 including an actuator 12 having a piston rod 14 extending therefrom is connectable to a load by means of the yokes 16 and 18 as is well known in the art. A servovalve 20 provides fluid flow to the actuator 12 from a source thereof (not shown) in accordance with signals applied thereto by means of the electrical wiring 22 as is well known in the art. Also provided is a solenoid 24 which provides fluid under pressure to the apparatus 26 for centering, bypassing and locking the actuator 12 in a predetermined position in acordance with the present invention. The structure 10 may be utilized in any application desired and is particularly adapted for utilization in an aerospace vehicle to position various types of apparatus, such for example as control surfaces under certain operating conditions. The apparatus of the present invention, however, may be utilized in any particular application desired where the requirement exists for positioning an actuator against a load from any other position to a predetermined position and thereafter locking it in place and maintaining that position even with removal of hydraulic power.

Figure 2:
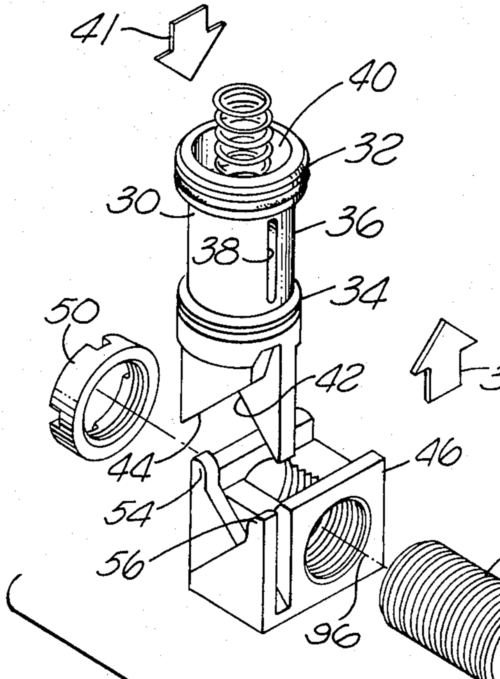
FIG. 2 is an exploded, isometric view showing the various parts constructed in accordance with the present invention.
Figure 2:
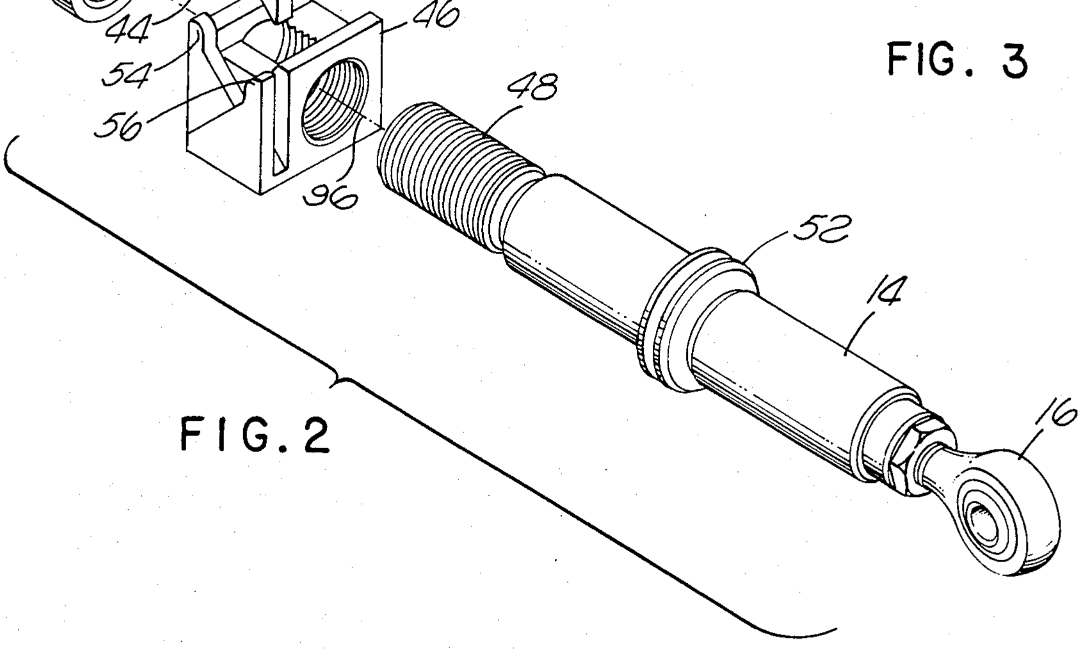

The centering and locking mechanism 26 is further illustrated in FIG. 2 and defines a cylinder within which there is positioned a piston 30. The piston 30 includes a pair of piston rings 32 and 34 at each end of a reduced diameter section 36 thereof. The rings 32 and 34 make contact with the cylinder (not shown) defined within the apparatus 26. Hydraulic fluid, under system pressure, is present within the reduced diameter portion 36 of the piston and as a result of differential sizes between the rings 32 and 34 the piston 30 is normally driven upwardly as shown by arrow 31 and in the absence of command signal is positioned such as to be in the non-centering and non-locking position as shown generally in FIGS. 2 and 3. The piston body 30 defines a slot 38 within which there is positioned a pin 39 that extends into the cylinder wall defined in the apparatus 26. The combination of the slot 38 and the pin 39 prevents the piston 30 from rotating when forces are applied thereto as will become more apparent hereinafter. As is illustrated at 40 the piston 30 is designed so as to receive pressure in response to signals applied to the solenoid 24. The application of hydraulic fluid under pressure, responsive to a command signal to the solenoid 24, into the hollow portion 40 of the piston 30 causes the piston to move downwardly as illustrated by the arrow 41. When the piston 30 moves downwardly, it carries with it a pair of drive surfaces 42 and 44 in the form of ramps preferably formed as an integral portion of the piston 30. The two surfaces 42 and 44 are spaced apart for a purpose to be more fully described hereinbelow.

A nut 46 is threadably received upon the threaded end 48 of the piston rod 14 and is held in place by a jam nut 50 which clearly secures the nut 46 once it is in the proper position. By appropriately loosening various portions of the overall piston rod 14 the nut 46 may be positioned at any point desired upon the threaded portion 48 of the piston rod 14. By providing such adjustability the position of the piston in the locked mode is variable infinitely within the limits of the position of the ramps 42 and 44. Such variability provides a degree of operation not heretofore available in the art. As is noted, the piston rod 14 includes an appropriate flange which is received within a cylinder formed within the actuator 12 to cause the piston rod to move reciprocally within the actuator 12 responsive to hydraulic fluid under pressure being applied to each side of the flange 52 in response to signals applied to the servovalve 20, as is well known to those skilled in the art.

The nut 46 defines a pair of cam surfaces 54 and 56 which are engaged by the drive surfaces 42 and 44, respectively, upon application of hydraulic fluid under pressure to the hollow portion 40 of the piston 30. As the surfaces 42 and 54 or 44 and 56 interengage and the force 41 is continuously applied, the ramp surface will cause sliding engagement between the driving and caming surfaces, thus causing the piston rod 14 to move to a position determined by the position of the nut 46 on the threaded portion 48 of the piston rod 14.

Figure 3:
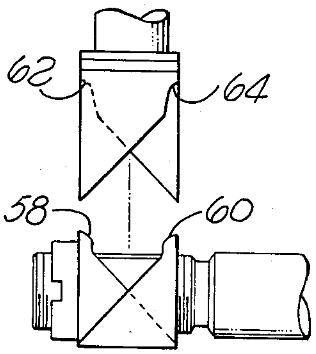
FIG. 3 is a side elevational view of a portion of the structure shown in FIG. 2 but in assembled form.

As is more clearly seen in FIG. 3, each of the cam surfaces 54 and 56 defines a cam lobe 58 and 60 which is first contacted by the driving surfaces 42 and 44, respectively. As the piston 30 moves into its locking position, the lobes 58 and 60 seat within a locking surface 62 and 64, respectively, defined by the driving surfaces 42 and 44, respectively.

Figure 4:
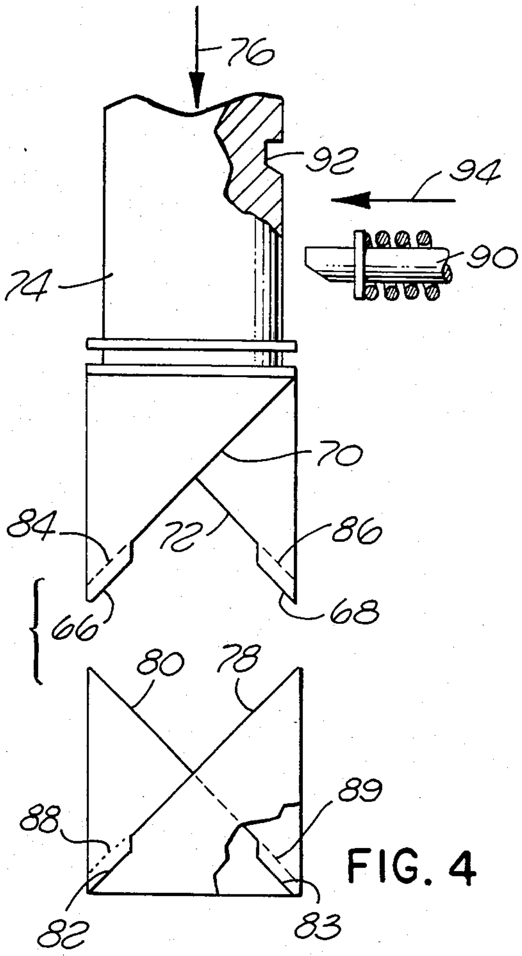
FIGS. 4 and 5 illustrate alternative embodiments of the structure as shown in FIG. 3.

Under some circumstances it is desired to reverse the positions of the lobes and locking surfaces and such is illustrated in FIG. 4. As is therein shown, appropriate lobes 66 and 68 are provided on the driving surfaces 70 and 72, respectively, of the piston 74 which moves downwardly as shown by the arrow 76 in response to the application of hydraulic fluid to the top portion of the piston 74, as above described. Either of lobes 66 and 68 contact the cam surfaces 78 and 80, depending on the nut position, to move the piston rod associated therewith as above described. The cam surfaces 78 and 80 each define a locking surface 82 and 83 respectively within which the lobes 66 and 68 are seated to lock the piston rod in position.

Under certain circumstances it may be desirous to totally eliminate the lobes and the locking surfaces from the driving and cam surfaces and such is illustrated by the dashed lines 84, 86, 88 and 89. Under these circumstances it may be desirous to provide an alternative means for locking the driving surfaces in engagement with the cam surfaces. Such alternative means is provided by a spring loaded pin 90 which engages an opening 92 provided in the side of the piston 74 when the pin 90 moves toward the piston 74 as illustrated by the arrow 94, which can only occur when the drive surfaces 66 and 68 are in their locking position and engage the cam surfaces 82 and 83.

Figure 5:
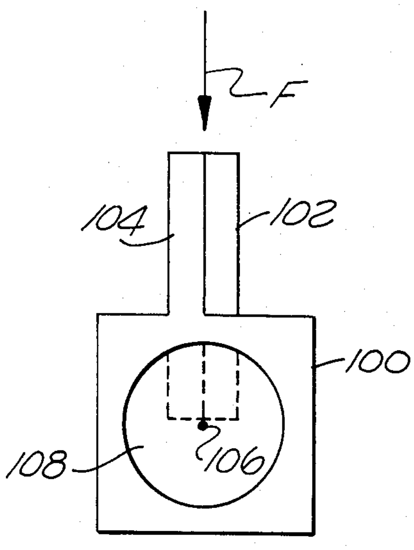

It will be noted that the cam and driving surfaces as illustrated in FIGS. 2 through 4 are disposed in a plane displaced from the longitudinal axis 96 of the piston rod 14. By such displacement it can be seen that torquing forces are applied to the piston rod 14 when the surfaces engage one with the other. Under some circumstances such torquing may not be desired and may be minimized by the modification as shown in FIG. 5. As is therein illustrated the nut 100 which is threaded onto the piston rod 14 has the cam surfaces 102 and 104 disposed such that they are in line with the longitudinal axis 106 of the threaded portion of the cylinder rod 108. Under these circumstances the forces F applied by the drive surfaces engaging the cam surfaces 102 and 104 are applied directly above the longitudinal axis of the piston 108, thereby minimizing the torque. It will also be understood by those skilled in the art that the surfaces 102 and 104 may be situated above a slot or depression formed within the rod 108 as is illustrated by the dashed lines 110 so as to receive a portion of the means defining the drive surfaces which engage the cam surfaces 102 and 104. By such construction the overall height required to receive the centering and locking apparatus constructed in accordance with the present invention would be somewhat diminished compared to that required for the full extension of the surfaces above the nut 100 as shown in FIG. 5. Alternatively, the surfaces 102 and 104 may be positioned one on each side of the nut 100 and spaced equidistant from the axis 106.

It will be recognized by those skilled in the art that the relative positions of the drive surfaces with regard to the cam surfaces as shown in FIGS. 2, 3 and 4 have been exaggerated for clarity of illustration and ease of understanding. By now referring to FIGS. 6, 7 and 8, the operative positions of the drive and cam surfaces along with the position of the rod of the hydraulic actuator are illustrated.

Figure 6:
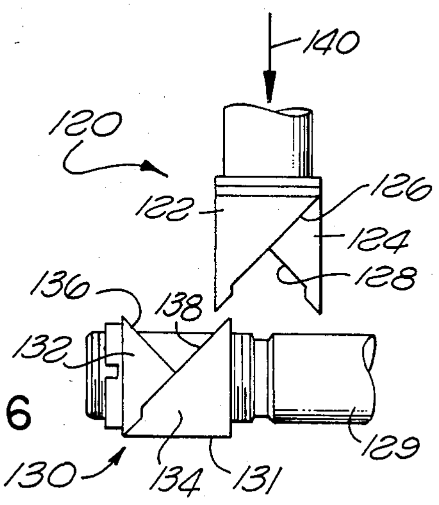
FIGS. 6, 7 and 8 illustrate the apparatus of the present invention in three of its operative positions.
Figure 7:
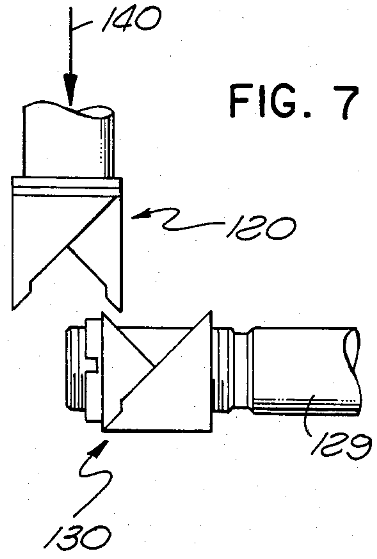
Figure 8:
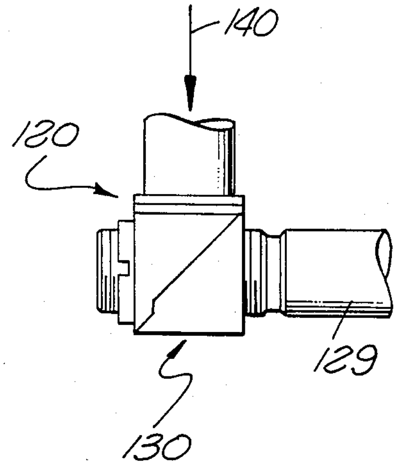

As is shown in FIGS. 6, 7 and 8, there is provided a first means 120 having a pair of fingers 122 and 124, each of which defines a driving surface 126 and 128. The surfaces 126 and 128 are formed as ramp surfaces and define an acute angle with respect to the longitudinal axis of the actuator rod.

A second means 130 includes the nut 131 which carries the triangular shaped bodies 132 and 134 which define the cam surfaces 136 and 138, respectively.

As can be seen, particularly with respect to FIGS. 6 and 7, the first (drive) means 120 is always disposed opposed the second (cam) means 130. Furthermore, the travel of the piston rod 129 is such that in its first limit position as shown in FIG. 6, the tip of the finger 122 is adjacent but overlaps the tip of the triangular body 134. Alternatively, when the piston rod 129 is in its opposite limit position as shown in FIG. 7, the tip of the finger 124 is opposed but overlaps the tip of the triangular body 132. As will be more clearly realized the fingers 122 and 124 are laterally displaced as are the triangular bodies 132 and 134. Therefore when force is applied as illustrated by the arrow 140, the first means 120 will move downwardly toward the second means 130 with one of the drive surfaces engaging one of the cam surfaces depending upon the respective position of the drive means 120 with regard to the cam means 130 until the drive means 120 is fully seated against the cam means 130 as is shown in FIG. 8. As will be recognized by those skilled in the art, the first means 120 is normally stationary with respect to the apparatus 10 while the piston rod 129 is movable therein responsive to signals applied to the servovalve 20. Thus, in all instances when the solenoid 24 is actuated to apply the force 140 to the first means 120 the drive surfaces will function with regard to the cam surfaces to return the piston rod 129 to the predetermined position as established by the position of the nut 131 on the piston rod 129, where it will thereafter be locked in position.

Although the present description has been given with respect to forces generated by hydraulic fluid acting against the first means 120, those skilled in the art will recognized that the force may be generated as a result of electrical or mechanical apparatus actuated in various manners to provide the desired force.

Through the use of dual ramps and dual cams disposed opposed each other, the overall length of the piston rod has been substantially reduced compared to prior art locking devices. Such effect is particularly evident from a consideration of FIGS. 6–8. If a single surface is used to move and lock the piston rod, then the rod must be capable of moving further. By effectively "folding" the surfaces one over the other the length required to implement a lock has been reduced by about 30%. Obviously this results in weight and space reduction resulting in overall increased efficiency.

There has been thus disclosed an effective centering and locking mechanism which, in response to an appropriate signal, returns a piston rod of an actuator to a desired predetermined position and locks it in that position even in the presence of opposing loads.

What is claimed is:

1. In a hydraulic actuator including a piston and a rod, apparatus for moving said actuator rod to predetermined position and locking the rod at the predetermined position comprising:

first means defining a ramp cam surface means on said actuator rod, said cam surface means defining a first acute angle with respect to the longitudinal axis of said rod;

second means defining a ramp drive surface means, said drive surface means defining a second acute angle with respect to the longitudinal axis of said rod, said drive surface disposed opposed said cam surface, said first and second angles being substantially equal;

one of said cam surface means and said drive surface means defining a recess therein and the other of said cam surface means and drive surface means including a lobe extending therefrom;

means for moving said drive surface means between first and second positions into engagement with and away from said cam surface means respectively;

said lobe first engaging said opposed surface as said drive surface moves into engagement with said cam surface; and said recess receiving said lobe for locking said rod in said predetermined position when said drive surface means is in said first position.

2. Apparatus as defined in claim 1 wherein said first means is a nut threadably received upon said rod.

3. Apparatus as defined in claim 2 wherein said ramp cam surface is disposed exclusively in alignment with said rod longitudinal axis when in its operative position.

4. Apparatus as defined in claim 2 wherein said ramp cam surface lies exclusively in a plane displaced from but parallel to said rod longitudinal axis.

5. Apparatus as defined in claim 4 wherein said cam surface means includes first and second individual ramps orthogonally disposed with respect to and displaced from each other.

6. Apparatus is defined in claim 5 wherein said drive surface means includes first and second individual drive ramps orthogonally disposed with respect to and displaced from each other, said first and second drive ramps being in engagement with said first and second cam ramps when said drive ramps are in said first position.

7. Apparatus as defined in claim 6 wherein said first and second cam surface ramps each include define a cam lobe at the end thereof, said cam lobes first engaging said drive surface ramps as said drive means move to said first position.

8. Apparatus as defined in claim 7 wherein said drive surface ramps each define a recess for receiving said lobes on said cam surface ramps for locking said rod in its predetermined position when said drive surface means is in its first position.

9. Apparatus as defined in claim 6 wherein said drive surface ramps each include a lobe at the end thereof said lobes first engaging said cam surface ramps as said drive means moves toward said first position.

10. Apparatus as defined in claim 9 wherein each of said cam surfaces defines a recess therein for receiving said lobes on said drive surfaces for locking said rod in said predetermined position when said drive surface means is in its first position.

11. Apparatus as defined in claim 2 wherein said nut and said rod are relatively rotatable to provide infinite adjustment within the limits of the threads on said piston rod.

12. Apparatus as defined in claim 6 wherein said first and second cam ramps overlap each other in side elevation.

13. Apparatus as defined in claim 6 wherein said drive ramps are orthogonally disposed with respect to each other.

14. Apparatus as defined in claim 13 wherein said first and second individual drive ramps overlap each other in side elevation.

* * * * *

UNITED STATES PATENT AND TRADEMARK OFFICE
CERTIFICATE OF CORRECTION

PATENT NO. : 4,526,058
DATED : July 2, 1985
INVENTOR(S) : Manfred A. Runkel et al It is certified that error appears in the above-identified patent and that said Letters Patent is hereby corrected as shown below:

Column 6, line 46, insert "individual" after "said" and before "first".

Column 6, line 49, insert after "said", -- first and second individual --.

Signed and Sealed this

*Twenty-fourth* Day of *December 1985*

[SEAL]

*Attest:*

DONALD J. QUIGG

*Attesting Officer* *Commissioner of Patents and Trademarks*